Figure 7:
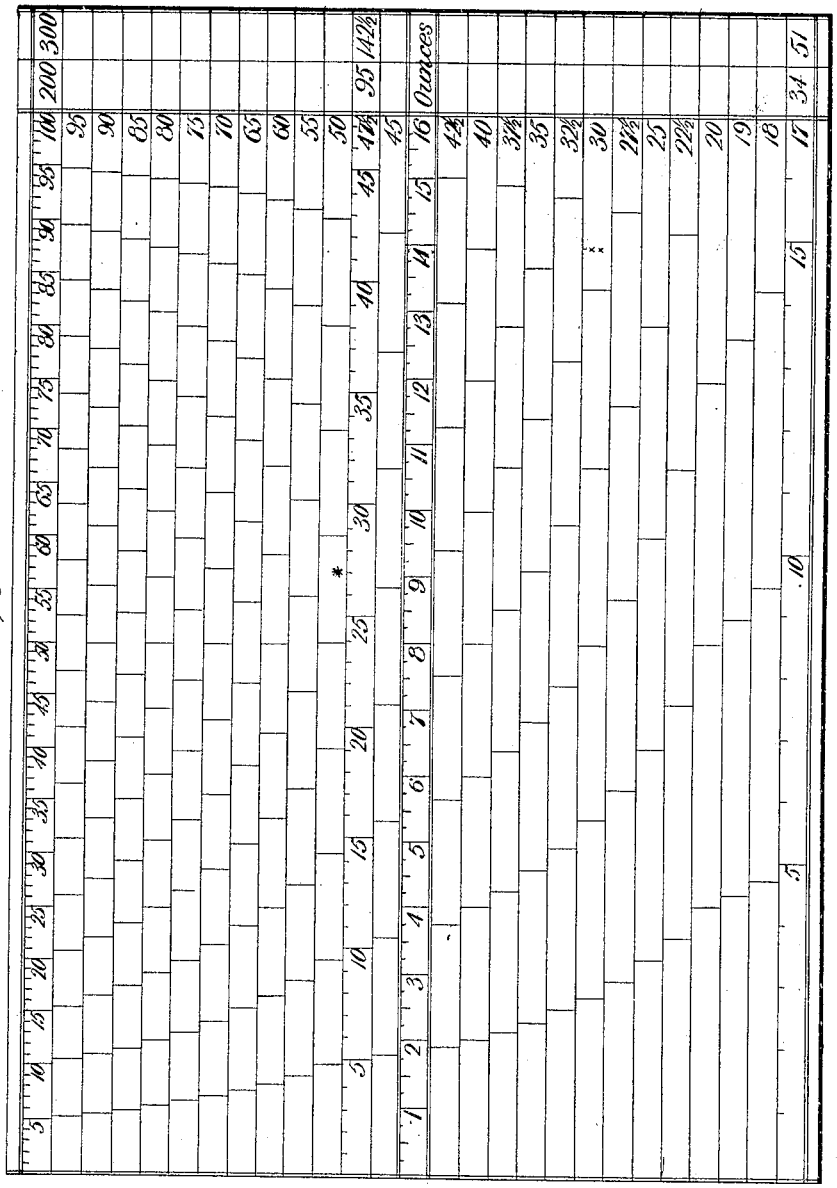

No. 808,516. PATENTED DEC. 26, 1905.
M. A. DEES.
COMPUTING SCALE.
APPLICATION FILED SEPT. 11, 1901.
5 SHEETS—SHEET 1.
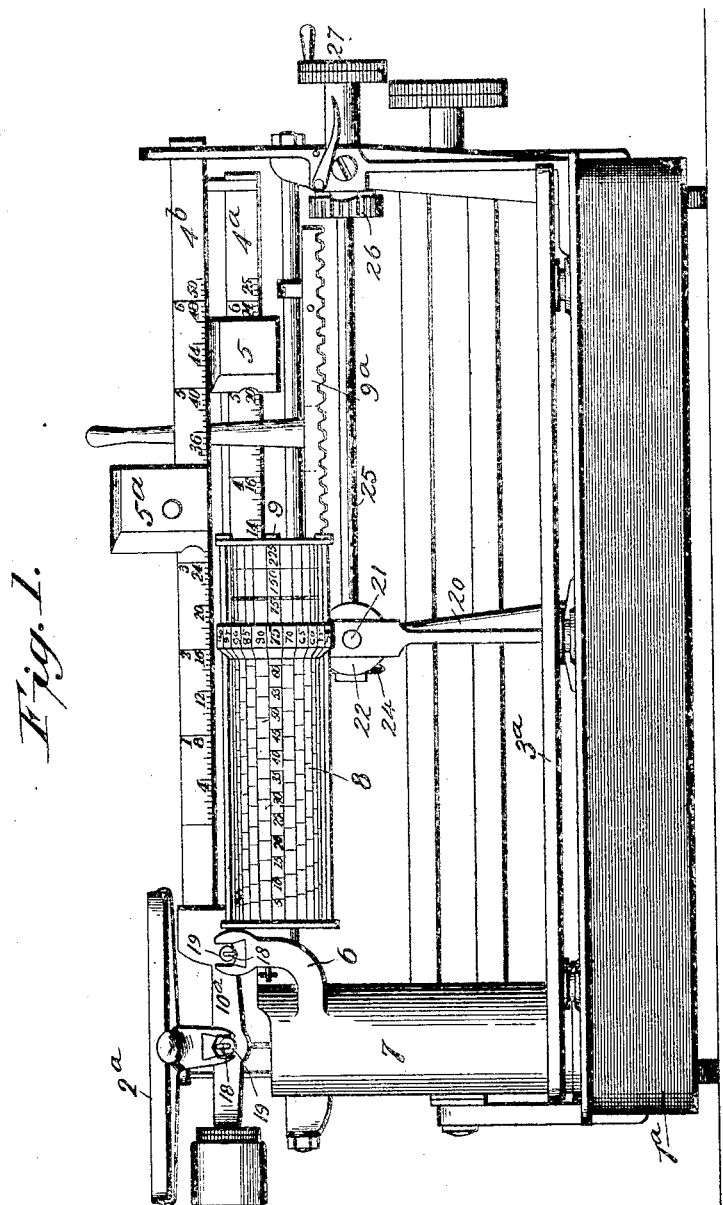

No. 808,516. PATENTED DEC. 26, 1905.
M. A. DEES.
COMPUTING SCALE.
APPLICATION FILED SEPT. 11, 1901.
5 SHEETS—SHEET 2.
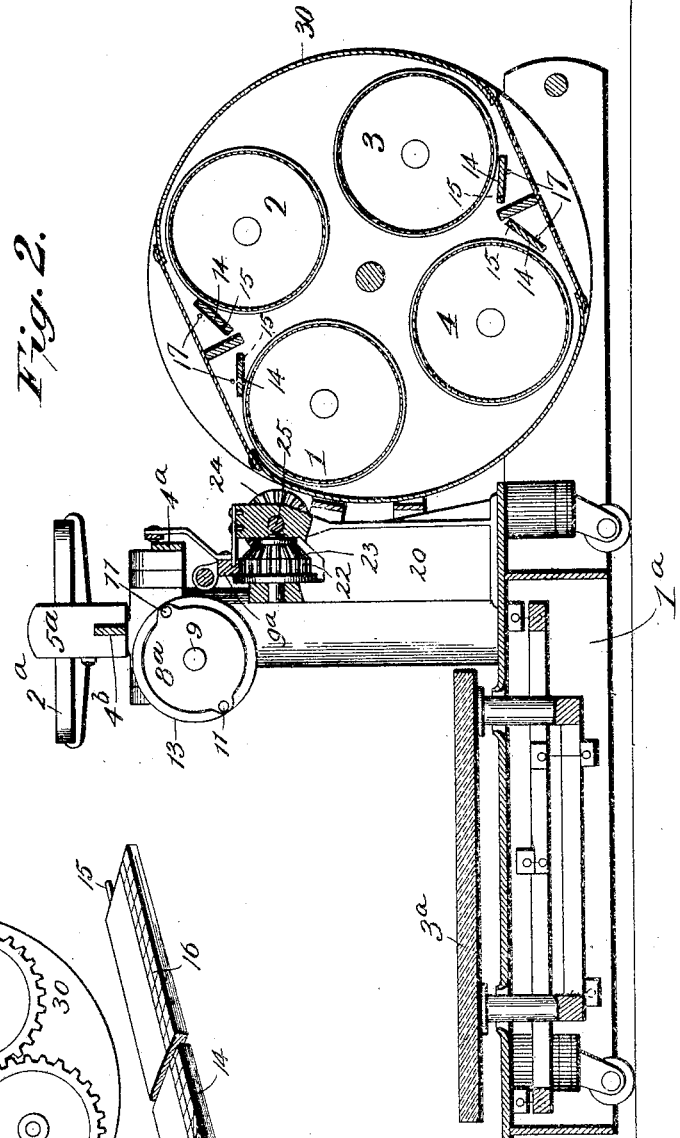
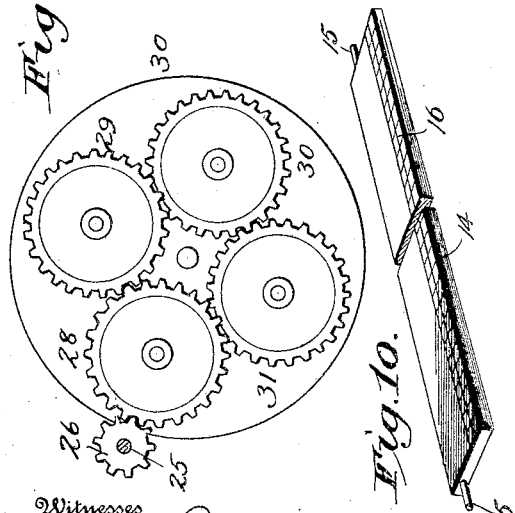

No. 808,516. PATENTED DEC. 26, 1905.
M. A. DEES.
COMPUTING SCALE.
APPLICATION FILED SEPT. 11, 1901.
5 SHEETS—SHEET 3.
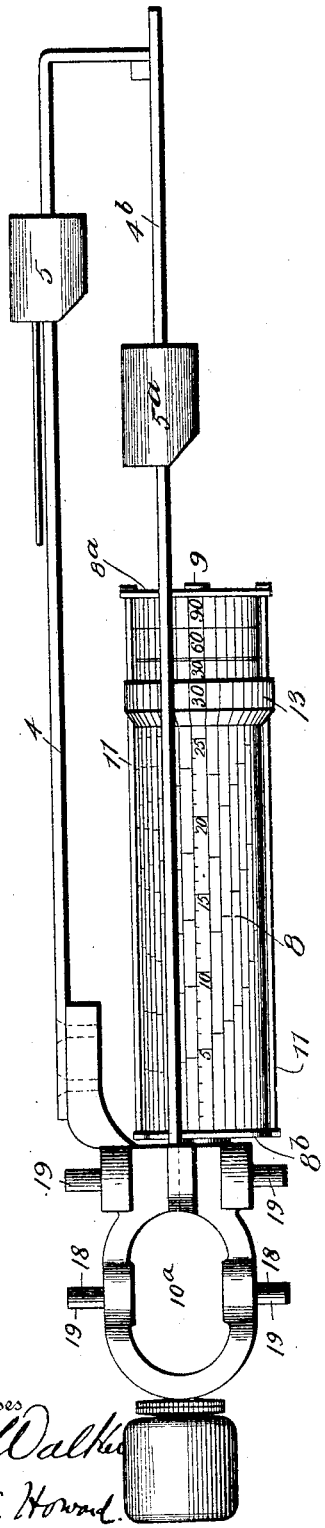
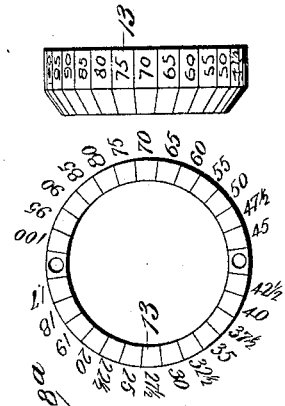
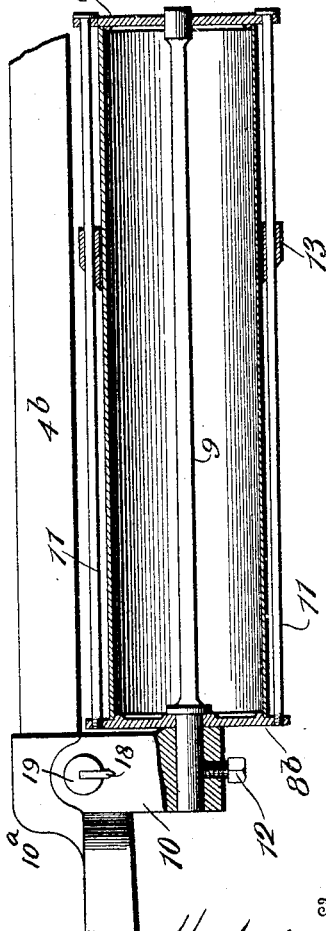

No. 808,516. PATENTED DEC. 26, 1905.
M. A. DEES.
COMPUTING SCALE.
APPLICATION FILED SEPT. 11, 1901.

5 SHEETS—SHEET 4.

No. 808,516. PATENTED DEC. 26, 1905.
M. A. DEES.
COMPUTING SCALE.
APPLICATION FILED SEPT. 11, 1901.

Witnesses
C. H. Walker.
Charles L. Howard.

Inventor
Mark A. Dees,
By
Attorneys.

UNITED STATES PATENT OFFICE.

MARK A. DEES, OF ST. LOUIS, MISSOURI.

COMPUTING-SCALE.

No. 808,516.　　　Specification of Letters Patent.　　　Patented Dec. 26, 1905.

Application filed September 11, 1901. Serial No. 75,063.

*To all whom it may concern:*

Be it known that I, MARK A. DEES, a citizen of the United States, residing at St. Louis, in the State of Missouri, have invented certain new and useful Improvements in Computing-Scales, of which the following is a specification, reference being had to the accompanying drawings and to the numerals of reference marked thereon.

My invention relates to improvements in computing-scales of the beam class, indicating and computing automatically the weight of the merchandise or article sold and the sum to be charged therefor, and more especially to improvements upon the inventions described in two applications, Serial Nos. 34,793 and 60,214, filed by me, respectively, October 29, 1900, and May 14, 1901.

My present invention is designed to provide a finer division of weights and values and otherwise more fully amplify the weighing and computing functions of such scales as are described in my aforesaid applications, and thus adapt them to a wider and more general field of usefulness.

The present improvement, while applicable to such scales as are contemplated in the above-mentioned applications, is equally adapted to other approved scales of the same general class.

It will be understood that in my present invention and in those described in applications Serial Nos. 34,793 and 60,214 many leading members or elements are commonly found, the general constructions and operations, except in particulars hereinafter pointed out, being, however, more in accordance with what is described in the later of the two said applications. Thus in the present case each member of the combined scale-beam, consisting of a main and a tare beam, is provided with a poise, that on the tare-beam being furnished with a catch for engaging or locking with its beam at specified points. There is also employed a shaft carrying a spur-wheel and a bevel-wheel, together with a rack adapted to constantly engage the spur-wheel, and a connection between the rack and the poise on the main beam, also a second shaft carrying a bevel and a spur wheel, the former engaging the bevel-wheel on the said first shaft, the whole being combined with a rotary computing mechanism independent of the scale-beam and geared to properly engage the spur-wheel of the second shaft. Means are also furnished whereby the poise of the main beam may be slid or moved upon said beam and the computing mechanism simultaneously rotated, all as fully and specifically set forth in my former applications.

In order that the general similarity in many essential respects between my herein-described invention and that of application Serial No. 60,214 may be seen, comparison is invited to Figs. 1 and 2 of this case and Figs. 1 to 6 of my said former application.

A special feature of improvement entering into the present case is the incorporation with the scale-beam of what I term a "small money-weight cylinder" having an annular poise, a function of said cylinder and poise being to permit the selling of a certain small weighed quantity of material at a certain high price. It is to be understood that the small money-weight cylinder is primarily used in weighing and computing small fractions up to one pound, or otherwise, in accordance with its construction. By sliding the annular poise to the graduation on the row of figures representing the number of ounces and fractions thereof the value of that quantity of material placed on the upper platform will be indicated in the row of figures showing the price per pound of said article. The quantity of material by weight having a known value per pound which may be bought for a certain sum of money is as readily ascertained by moving the poise to the graduation marking the money's worth required in the price-per-pound row. The quantity by weight can then be seen on the row representing ounces. It will further be understood that the small money-weight cylinder is used in connection with other cylinders acting upon the same principle, and its capacity for such use and the several novel and useful functions of said small cylinder, both as an adjunct to the scale proper and as a device operatively independent thereof, will be fully hereinafter described.

Other novel and valuable features and combinations are hereinafter described, and more particularly pointed out in the claims.

In the accompanying drawings, Figure 1 is a front elevation of my invention, showing the poise of the tare-beam at twenty-five pounds and the poise of the main or weight beam adjusted for twenty pounds. Fig. 2 is a vertical transverse section through the longitudinal center of the frame, lower platform, computing-cylinders, and the casing and illustrating other details of improvements hereinafter described. Fig. 2ª is an end view of the cylindrical casing and the gears for turning the computing-cylinders. Fig. 3 is a plan view of the entire scale-beam, comprising the tare and weight beams and the small money-weight cylinder, as also other details hereinafter referred to. Fig. 4 is a longitudinal sectional view through the small money-weight cylinder. Fig. 5 is a front end view of the annular poise used in connection with the small money-weight cylinder. Fig. 6 is a side view of the same. Fig. 7 is an extended or stretched-out view of the chart used with the small money-weight cylinder. Fig. 8 is a smaller view of a chart used in connection with the larger money-weight-computing cylinder 1 seen in Fig. 2. Fig. 9 represents a scale graduated for prices; and Fig. 10 an adjustable straight edge along which the fixed price-scale, Fig. 9, is used.

Similar numerals of reference indicate similar parts in the several views.

Referring particularly to Figs. 1 and 2, 1ª is the base or foundation having the upper platform 2ª and the lower one, 3ª. 4ª is the main beam having a poise 5 (in the present and both of my said preceding cases) of one pound, and 4ᵇ is the tare-beam, having in this case a poise 5ª double the weight of poise 5. The main and tare beams stand in parallel relation to each other; but the tare-beam, as shown, is in a higher horizontal plane than that occupied by the main beam. Both beams, they being rigidly attached together, are mounted or have their fulcra in brackets 6 of the standard 7 and provided with appropriate unions with the platform hanging connections, which need not here be more particularly referred to. The small money-weight cylinder (which hereinafter, however, will be termed the "small cylinder") is represented by 8, its axle 9 being rigidly secured to the fulcrum-head of the scale-beam. The annular poise is shown by 13. The chart Fig. 7, used with the small cylinder 8, is in the present instance adapted to weigh up to one pound, a pound being divided into sixteen ounces and the ounces into fourths, the fractions of pounds being arranged longitudinally on the cylinder. The vertical column of figures on the right of the chart Fig. 7, running from seventeen cents to one dollar, represents the price per pound, and the horizontal figures on the top edge, bottom, and near the middle, running from five cents to one dollar, five cents to seventeen cents, and five cents to forty-seven and one-half cents, respectively, represent values of goods at one dollar, seventeen cents, and forty-seven and one-half cents per pound, respectively.

In illustration of the use of the chart, Fig. 7, let the row of figures running longitudinally thereof, ranging from five cents to forty-seven and one-half cents, be taken. Thus if a buyer should wish to purchase twenty-seven cents' worth of goods the price of which is forty-seven and one-half cents per pound the annular poise upon the small cylinder would be run upon said cylinder to the mark indicated by a star, which would show that he would get about nine ounces of the material, the poise also carrying the price per pound registering with the figure "9" on the row of figures indicating fractions of a pound. This amount of material would then be weighed upon the upper platform, the ordinary weight-poise of the main beam having been placed at zero and the tare-poise also run back to zero or properly placed for the tare-weight, if any. It will be understood that in ordinary usage all weights over one pound would be weighed and computed on the larger cylinder 1, yet to be particularly described. The columns of figures ranging from "34" to "200" and "51" to "300," respectively, on the right-hand side of the chart, Fig. 7, may be used to enable the seller to determine the price of two or three pounds at the price indicated upon the row of figures ranging from "17" to "100" upon the chart. Thus, for example, two pounds of a commodity worth forty-seven and one-half cents per pound would, as shown, cost ninety-five cents, and three pounds one dollar and forty-two and one-half cents, and, as seen at the bottom of the chart, two pounds at seventeen cents would be worth thirty-four and three pounds fifty-one cents. In weighing and determining mentally the price of two pounds the tare-poise is moved out to one pound, after which the annular poise on the small cylinder is run to the one-pound limit, by which means the two pounds are obtained. In weighing and mentally computing the price of three pounds the tare-poise is placed at two pounds and the annular poise run out to the limit; but it is to be distinctly understood that the preferred way of weighing and computing over one pound is to resort to the larger cylinder 1, said cylinder 1 and the small cylinder both using the upper platform, yet in the sale of high-priced articles or where a very sensitive and accurate weight is needed whole pounds may be weighed and computed on said cylinder 1 and whatever fraction or fractions of the pound there may be may be weighed and computed upon the small cylinder and the two sums added together. While the small cylinder may thus be used as an adjunct to said cylinder 1, it can also be used in the weighing of the fractions of the last pound (on the large or lower platform) when either cylinder 2, 3, or 4 is used; but in the use of the small cylinder with either of said cylinders 2, 3, or 4 each unit on the small cylinder would necessarily be multiplied by four, as the two platforms employed are as four is to one. It is further to be distinctly understood that while the small cylinder is adapted to the various functions hereinbefore described it may be used without any reference whatsoever to the main or tare beam or to cylinders 1, 2, 3, and 4, it being in itself in effect, function, and operation an entirely distinct and separate scale-beam and computer up to its capacity, which, as here shown, is one pound.

Only enough figures are filled in the chart, Fig. 7, to illustrate the object and use thereof. The special function of the chart shown in Fig. 7 is to weigh and compute the values of articles of high price, as teas, spices, coffee, &c. It is to be remembered, however, that the charts and systems of computations here illustratively given are not arbitrary nor affect the mere mechanical features and combinations entering into my invention.

Referring to Figs. 3 and 4, the small cylinder 8 is mounted upon an axle 9, fixed to a lug 10, depending from the lower part of the beam or fulcrum head $10^a$ at or under its fulcrum. The small cylinder 8 has two heads $8^a$ and $8^b$, each of which is bored to fit over the axle 9, the heads being tied together by screw-rods 11, the barrel of the cylinder being confined between the heads and bearing the chart, Fig. 7. The axle 9 is secured (see the left-hand side of Fig. 4) to the lug 10 above mentioned by means of a set-screw 12. The axle is then held tightly in the lug, or said axle may be adjusted longitudinally in the event of the binding of the cylinder, wear, &c. The screw tie-rods 11 also serve as longitudinal guides and supports to the annular poise 13, (see Figs. 4, 5, and 6,) the internal diameter of the poise being slightly greater than the exterior diameter of the cylinder, so as to prevent damage to the figuring upon the surrounding chart by friction, &c. The small cylinder 8 is adapted to revolve or turn upon its axis in order that the prices and values may be brought in full view of the operator and also turned so as to be seen by the purchaser.

The scale-beams as shown particularly in Fig. 3 are substantially the same as shown in my aforesaid applications, except that the small money-weight cylinder 8 and its accompanying parts are added. The annular poise 13, as seen especially in Fig. 6, bears upon its face prices per pound, the prices ranging from "17" to "100," thus corresponding with the column of price-per-pound figures near the right of Fig. 7. In further illustration of the poise 13 in connection with the chart, Fig. 7, encircling the small cylinder 8 let it be supposed a purchaser wishes to obtain twenty-six cents' worth of butter at thirty cents per pound. The poise 13, with the figure "30" arranged to stand outward or in front of the seller is to be slipped along the cylinder until the figure "26" is reached, when it will be indicated that about thirteen and one-half ounces of butter are to be sold for that sum. (See the double star, Fig. 7.) This amount of butter is placed upon the small platform, weighed, and given to the customer. The small cylinder 8 is, as before indicated, in fact a supplemental scale-beam, and as its poise is moved or adjusted on the cylinder it may be used to weigh an unknown quantity of goods placed on the upper platform or set the scale to ascertain the value of a known weight the price per pound of which is determined or to indicate the weight of substances of known value weighing one pound or less, and, as hereinbefore shown, by the combined use of the small cylinder 8 and the cylinder 1 a greater amount may be weighed and the smallest fraction of the last pound accurately shown. As the price-per-pound numbers arranged around the poise 13 agree with the price-per-pound figures near the right-hand column or circle on the chart, Fig. 7, not only is there weighed or made ready to be weighed a commodity of which the price per pound is known, but the buyer is, and the seller may be, informed exactly how much of the commodity at a given price per pound can be bought for a specified sum, for after the operator has seen the weight and value he may by turning the small cylinder to the purchaser enable the latter to be also informed. The extreme right-hand columns or rings of figures on the chart, as already described, are double and treble in amount the price-per-pound figures on the row or circle of figures on the poise and near the end of the chart. The limit of movement of the poise (see Fig. 1) is to the double line on the chart, which indicates a full pound. Thus, if the purchaser wishes to buy twenty-seven cents' worth of tea at seventy-five cents per pound the poise 13 would be slipped to the left from the position in which it is seen in Fig. 1 to the star near the figure "25," when by turning the cylinder so as to bring the weight-column to the proper place the number of ounces will be found at the operative edge of the poise—in this case about six ounces. This feature of my invention, therefore, permits of the ready computation of high prices and low weights without resorting to the subdivisions of the larger charts yet (for purposes of illustration) to be referred to. It will be understood that the said charts last referred to are used in connection with the two pairs of geared cylinders, (indicated by the numerals 1, 2, 3, and 4, which are locked as a series at all times when not connected with the poise-operating device of the main beam and that while one pair is always geared together only one cylinder of the pair is designed to be used for computing at one time. These cylinders are not necessarily to be released from the poise when the small cylinder 8 is used. Ordinarily they would not be released, for at any time it may be desired to use the small cylinder 8 in conjunction with the cylinder 1. One cylinder of one pair may be employed to compute values of low weight for the upper or smaller platform and the other one of the pair to compute values of greater weight for the lower or main platform. (Only cylinder 1 is used for the upper or small platform.)

The computing-cylinders 1, 2, 3, and 4 are revolved on their axes by the mechanism illustrated in Figs. 1, 2, and 2ª. In bearings on a standard 20, secured to the foundation 1ª, is mounted a cross-shaft 21, carrying two gear-wheels 22 and 23, the latter being a bevel-gear which may be engaged at certain times with a similar gear 24 on a longitudinal shaft 25. The gear 22 operates a rack-bar 9ª, placed above it and connected to the poise 5 on the main beam. The opposite end of the shaft 25 is provided with a hand-wheel 27 and a gear-wheel 26. The shafts of the internal computing-rolls 1, 2, 3, and 4 extend through the cylindrical casing at one end and are there provided with gears 28, 29, 30, and 31, each of which may be placed in mesh with the gear 26. The gears 28 and 29 are permanently in engagement with each other, as are gears 30 and 31, by which arrangement the computing-cylinders 1 and 2 turn simultaneously, as do 3 and 4, when the gear 20 is in engagement with either gear 30 or 31.

As fully explained in my aforesaid application, Serial No. 60,214, while the upper and lower platforms are not intended to be used together, the cylinders of the pair being geared together so as to rotate simultaneously, either platform may be used, one for lighter and the other for heavier weights. Provision is also made for the use of the rotatable casing containing the rotatable computing-cylinders as a computing device for still heavier weights.

Having thus briefly alluded to the internal computing-cylinders, I will now proceed to describe a chart adapted for use with cylinder 1 of the series, and while I have only illustrated, Fig. 8, one chart and described it as adapted for use with the computing-cylinder 1 used only with the upper platform it will be understood that the charts for cylinders 2, 3, and 4 are upon the same money-weight principle and plan, except that they run up to higher weights, but with decreasing prices per pound, and are used with the lower platform. Thus while the chart, Fig. 8, will only compute to six and one-fourth pounds on the upper platform the chart for cylinder 2 will compute up to twenty-five, that of cylinder 3 to fifty, and that of cylinder 4 to seventy-five pounds, all the last three on the lower platform. A general description of the chart shown in Fig. 8 will therefore illustratively suffice for all the others. It will be seen that at the longitudinal center of the chart are two columns of figures. Beginning at the bottom of the chart for cylinders 1 and 3 and at the top for cylinders 2 and 4, there are in the right-hand column made by the horizontal lines divisions or spaces running from "1" to "15," indicating ounces, the next division or space being one pound. Continuing with the column, it will be seen that every other space is devoted to ounces, which are counted with the pounds in the left-hand columns. Thus there will be seen to be (blank space being left for odd ounces) one pound two ounces, one pound four ounces, one pound six ounces, up to one pound fourteen ounces. The columns continuing in the second spaces above the one pound fourteen ounces will be found two pounds and in the second space above that two pounds two ounces, the same arrangement continuing up to six pounds four ounces, or six and one-fourth pounds.

All the charts—viz., for cylinders 2, 3, and 4—have values independent of the above-described weight-divisions, yet each value in money is based on a given price per pound.

On the chart, Fig. 8, only enough figures are represented scattered about to indicate the theory of computing the cost of certain articles at stated prices per pound. Thus a complete row of figures is seen at the right of the chart, indicating computations of the prices of given weights of articles at fifty cents per pound marked upon the price-per-pound scale, Fig. 9. Also, a column of figures indicates computations at sixteen, eight, and five cents per pound. It will be understood that all the spaces in the chart are to be filled with figures showing the necessary number of cents computed, spaced, and arranged according to the indicated prices per pound. In my two aforesaid applications the values are in squares longitudinally opposite the weights; but in the present instance the values in cents are necessarily arranged in zigzag or staggered order.

The price-per-pound scale 16, Fig. 9, is used in connection with the straight edge 14, being placed thereon, as seen especially in Fig. 10. Hereinafter I will use the term "fixed price-scale" to designate the combined price-per-pound scale 16 and the straight edge 14, by which it is carried; but by the term "fixed" is meant that the several straight edges 14, bearing the scales 16, are each fixed with relation to their respective cylinders, although they are each provided with pins 15 and have pivotal movement and also revolve with the large casing. The price-scale 16, Fig. 9, is furnished with figures indicating sums ranging from one and one-fourth cents to fifty cents, there being two horizontal rows of figures, so as to prevent confusion in reading. In the similar price-per-pound scale used for cylinder 2 the prices will run from one and one-fourth cents up to forty cents; in that for cylinder 3 from one and one-fourth cents up to thirty cents; in that for cylinder 4 from one and one-fourth cents up to twenty-five cents. It will therefore be seen that, beginning with the small cylinder 8 and using cylinders 1, 2, 3, and 4 and the large casing in which the four last-named cylinders are mounted, I extend the progressive system, described in a lesser degree in my said earlier application, Serial No. 34,793, and further amplified in my later application, Serial No. 60,214.

The mode of use of the chart, Fig. 8, in connection with cylinder 1 and its fixed price-scale, as shown mounted in Fig. 10, is substantially as described in my former application, Serial No. 60,214. The fixed price-scale (shown as an entirety in Fig. 10) is pivoted at each end in the head of the casing 30 on pivots 15, bearing lightly upon the heads, so as to escape contact with the surface of the cylinder. Thus damage to the chart is prevented, while the pivoted price-scale is brought as near as practicable to the surface to prevent confusion in the reading of the computations and weights. A pin 17 limits the movement of each pivoted price-scale. By using a scale of this class the small cylinder, secured to the scale-beam and graduated longitudinally by divisions at which values of cents and dollars are indicated by a movement of the annular poise on the cylinder, in connection with a series of larger computing-cylinders independent of the scale-beam, what is above mentioned as a "progressive system" of computation is provided for. This will be understood from the fact that the graduations longitudinally for values on the small cylinder 8 are at a high rate per unit and at a low or small division of units, while the larger cylinder or cylinders (independent of the scale-beam) are graduated circumferentially by divisions for values of cents and dollars at a lower price per unit and larger divisions of units. An important feature of my invention, therefore, involves the use of the small cylinder 8, secured to the scale-beam and graduated longitudinally with high-price marks and small divisions of units, with, say, cylinder 1 independent of the scale-beam divided circumferentially by graduations of values at a lower price per unit and a larger division of units. The same will be understood of cylinders 2, 3, and 4. It will be seen, however, that while what is termed the "small money-weight cylinder" (here designated by 8) and its chart, Fig. 7, are mounted upon the scale-beam, and therefore form, in effect, an independent scale-beam, the other cylinders 1, 2, 3, and 4, each having what may be termed a "money-weight chart," are detached from the scale-beam and are entirely independent thereof and operatively connected to the poise on the scale-beam. Thus the small or money-weight cylinder 8, mounted upon the scale-beam having thereon prices per pound ranging from seventeen cents to one dollar, will not only weigh one pound, but that pound is divided up into small fractions—viz., sixty-fourths. Therefore it is evident that the cost of the smallest quantity of a high-priced article may be readily computed by the use of this small money-weight cylinder 8 and its poise entirely irrespective of the use of any other portion of the scale, but that should more than one pound be required to be weighed the same system of determining how much material at a given price per pound for a certain sum may be carried out by the use of the cylinder 1, with the upper platform, or, if the weight is beyond the capacity of that cylinder, by either of the other cylinders 2, 3, or 4, the article being weighed upon the lower platform. Should the small cylinder 8 be ever used with cylinders 2, 3, or 4 and the lower platform, each unit on the small cylinder would necessarily be multiplied by four.

A special feature of improvement entering into my present invention is that by the use of the small money-weight cylinder 8 the last pound in a given weight up to seven and one-fourth pounds may be minutely divided for the cylinder 1. Thus while the small money-weight cylinder provides a computing-scale wholly independent of the other cylinders it performs the novel and highly-important function of enabling the last pound on cylinder 1 to be minutely divided. It therefore while independent of cylinder 1 may be useful if combined with it. Another improvement in my present invention upon what is described in my said prior applications is in the use of a tare-poise of double the weight of the main poise, the tare-poise being used as a counterweight when going from cylinder 2 to cylinder 3 and from 3 to 4. It will be observed that the tare-beam is graduated up to fifty pounds, so that this fifty pounds added to the twenty-five pounds capacity of the main beam or poise increases the capacity of the scales to seventy-five pounds, which can only be done in my aforesaid applications, Serial Nos. 34,793 and 60,214, by the use of counterweights. Thus the scale described in application Serial No. 60,214 is only capable of weighing twenty-five pounds without a counterweight, although its capacity may be increased indefinitely by the addition of suitable counterweights, which, however, in my present invention are rendered unnecessary.

The operation of my invention will be clearly understood from the preceding description and as to parts not herein specifically described by reference to my aforesaid prior applications.

Among the minor features of my present invention may be mentioned the arrangement by which the small money-weight cylinder 8 may be adjusted longitudinally to relieve binding or take up wear and whereby the annular poise used with said cylinder is supported and guided by rods which take the weight of the poise from the cylinder. Furthermore, a novel feature is the employment of an annular poise having the inner diameter somewhat greater than that of the cylinder, so as to prevent damage to the chart surrounding the cylinder by friction or chafing.

It is obvious that the special chart herein described may be used with the small money-weight cylinder 8 and similar charts for weighing or determining the value of a larger amount of material at stated prices with cylinders 1, 2, 3, and 4 or that the system of independent charts ranging from a low fraction of a pound and a low fraction of a cent per unit up to any desired weight and to the price of expensive goods, as specially described in my application Serial No. 60,214, may be used upon the internal computing-cylinders incorporated in my present application; but the salient, distinctive, and most essential features or principles of the invention herein described are in the use of the small money-weight cylinder 8 and its charts and other accessories as an independent scale-beam performing useful functions either independently or as an adjunct to other parts of the scale and in the use throughout of charts of the same general character and description, all of which are strictly money-weight charts—that is, charts which will indicate exactly what amount of goods at so much per pound may be bought for a specified sum—this principle involving what is hereinbefore referred to as the "progressive system."

Attention may be called to further differences between the present invention and those described in my aforesaid applications. In this case, while the values on all of the cylinders are based on certain prices per pound, yet to avoid fractions of cents or the "giving" or "taking" of fractions in reading the values (as in my two said former applications) the values in the present case are not opposite the weights, (except in isolated cases,) as will be seen from the chart, Fig. 8. In my said two earlier cases squares are provided by lines designating weights and prices per pound; but while in the present instance no regular squares are produced the values are necessarily opposite the prices per pound, yet as a dollar is divided into one hundred parts and a pound into sixteen, thirty-two, or sixty-four parts it is evident the divisions of pounds will as a rule not come opposite the divisions of dollars, yet when the weighing is performed, as may be expressed in money, by the use of the device 14 16, Fig. 10, the purchaser may readily be informed very nearly the exact weight, if desired, of the commodity which he may buy for a certain amount at so much per pound. It is also important to note that in carrying out my progressive system to its fullest extent the values on the small money-weight cylinders 8 are made to run in longitudinal or horizontal lines, while the values on cylinders 1, 2, 3, and 4 and the large casing in which said cylinders are mounted run in circumferential lines.

The knife-blades 18, Figs. 1, 3, and 4, for the purpose of allowing repair or substitution in the event of wear are removably inserted in slots formed in lugs 19, projecting from the sides of the fulcrum end of the beam.

It is evident that modifications of constructions and combinations herein described may be made by the skilful mechanic without departing from my invention, and such departures from what is herein set forth not involving invention I consider as within the terms of my claims.

Having thus described my invention, I claim—

1. In a scale, the combination with a fulcrum-head, of a beam, a poise adapted to traverse the beam, rotatable computing mechanism independent of said beam but arranged to be operatively connected to its poise; a shaft secured to the fulcrum-head, and a rotatable computing-cylinder on the shaft and provided with a poise, substantially as set forth.

2. In a scale, weighing members including a beam and a poise, combined with rotatable computing mechanism independent of said beam but adapted to be operatively connected to its poise; a shaft secured to the fulcrum-head; a rotatable computing-cylinder on said shaft and provided with a poise; and means whereby said rotatable computing-cylinder may be employed independently of the first-named rotatable computing mechanism, or used therewith, substantially as set forth.

3. In a scale, weighing members including a beam and a poise, combined with rotatable computing mechanism detached from said beam and independent thereof but adapted to be operatively connected with its poise; a shaft secured to the fulcrum-head of said beam, and a supplemental computing mechanism consisting of a rotating cylinder journaled on said shaft and carrying a poise; said supplemental mechanism being adapted to weigh and compute lesser weight and higher value per unit, and the other rotary computing mechanism greater weight and lesser value per unit, substantially as set forth.

4. In a scale, weighing members including a beam and a poise, combined with rotatable computing mechanism consisting of cylinders detached from said beam and independent thereof but adapted to be operatively connected with its poise; and a supplemental computing mechanism consisting of a rotatable cylinder secured to said beam and carrying a poise; said first-named rotatable computing-cylinder being graduated by divisions for values of cents and dollars at a certain price per unit and for certain divisions of units, and the supplemental computing-cylinder being graduated for values at a higher rate per unit and at a lower or smaller division of units, substantially as set forth.

5. In a scale, weighing members including a beam and a poise, combined with rotatable computing mechanism consisting of cylinders detached from said beam and independent thereof but adapted to be operatively connected with its poise; and a supplemental computing mechanism consisting of a rotatable cylinder secured to said beam and carrying a poise; said first-named rotatable computing-cylinders being graduated circumferentially by divisions for values of cents and dollars at a certain price per unit and for certain divisions of units, and the supplemental computing-cylinder being graduated longitudinally for values at a higher rate per unit and at a lower or smaller division of units, substantially as set forth.

6. In a scale, the combination of a beam and a poise; an upper and a lower weighing-platform; rotating computing mechanism independent of said beam but adapted to be operatively connected to its poise; a rotatable computing-cylinder secured to said beam and provided with a poise, and adapted to be used independently of the aforesaid computing mechanism with the upper platform, or as an adjunct thereto with the upper or the lower platform, substantially as and for the purposes set forth.

7. In a scale, weighing members including a beam and a poise, and an upper and a lower platform for lighter and heavier weights respectively, combined with rotatable computing mechanism detached from said beam and independent thereof but adapted to be operatively connected with its poise; and a rotatable computing-cylinder secured to said beam and provided with a poise; whereby said rotatable computing-cylinder may be used with the upper platform independently of the first-named rotating computing mechanism, or used therewith and with either the upper or the lower platform, and computations of two independent sets of computing mechanism may be conveniently added, substantially as and for the purposes set forth.

8. In a scale, the combination with a beam having a stud-axle secured to the fulcrum-head of said beam and parallel therewith, of a computing-cylinder revolubly mounted upon said axle and carrying an annular poise, and rods for guiding and holding said poise against independent rotation, substantially as set forth.

9. In a scale, the combination with a main weighing-beam having a fulcrum-head $10^a$ rigidly attached thereto, of an axle secured to the fulcrum-head and parallel with but detached from the beam, a computing-cylinder rotatably mounted upon said axle, and a poise on said cylinder, said axle being longitudinally adjustable in the fulcrum-head with respect to the beam, substantially as set forth.

10. In a scale, the combination with a beam and an axle secured thereto parallel therewith, of a computing-cylinder rotatably mounted upon said axle, an annular poise thereon having an internal diameter greater than the exterior diameter of the cylinder and its chart, and guide-rods secured to the cylinder and parallel to its axis for supporting and preventing independent rotation of the poise and prevent friction on the cylinder, substantially as set forth.

11. In a scale, the combination of a rotatable computing-cylinder and a price-scale for use with said cylinder, said price-scale being pivoted at its ends and near one of its edges to supports beyond the peripheral surface of said cylinder, the free edge of said price-scale being adapted, by the force of gravity, to rest adjacently to the surface of the cylinder, substantially as set forth.

12. In a scale, the combination of a casing or support, a rotatable computing-cylinder mounted therein and having a head at each end, and a price-scale pivoted in said casing or support so that the free edge of said price-scale shall bear upon the heads of the cylinder and escape contact with the cylinder proper, substantially as set forth.

13. In a scale, the combination of a casing or support, a rotatable computing-cylinder mounted therein and having a head at each end, a price-scale pivoted in said casing or support so that the free edge of said price-scale shall bear upon the heads of the cylinder and escape contact with the cylinder proper, and a pin for limiting the movement of said pivoted price-scale, substantially as set forth.

14. In a scale, weighing members including a beam and a poise, combined with rotatable computing mechanism consisting of cylinders detached from said beam and independent thereof but adapted to be operatively connected with its poise; and a supplemental computing mechanism consisting of a rotatable cylinder secured to said beam and carrying a poise, substantially as set forth.

15. In a scale, weighing members including a beam attached to a fulcrum-head and a poise, combined with rotatable computing mechanism consisting of a cylinder detached from said beam and independent thereof but adapted to be operatively connected at will with its poise; and a supplemental computing mechanism consisting of a rotatable cylinder secured to the fulcrum-head independently of said beam and carrying a poise, substantially as set forth.

16. In a scale, the combination of a fulcrum-head, a main beam rigidly attached thereto, a shaft adjustably supported by the fulcrum-head, a rotatable computing-cylinder mounted on said shaft, and a poise surrounding the computing-cylinder, substantially as set forth.

In testimony whereof I hereunto set my hand and seal.

MARK A. DEES. [L. S.]

Witnesses:
W. E. GRAYSON,
A. W. STANDING.